(12) United States Patent
Kariya et al.

(10) Patent No.: US 7,794,671 B2
(45) Date of Patent: Sep. 14, 2010

(54) HOLDING SEALER AND EXHAUST GAS PROCESSING DEVICE

(75) Inventors: Satoru Kariya, Ogaki (JP); Hideki Matsui, Ogaki (JP)

(73) Assignee: Ibiden Co., Ltd., Ogaki-shi (JP)

( * ) Notice: Subject to any disclaimer, the term of this patent is extended or adjusted under 35 U.S.C. 154(b) by 529 days.

(21) Appl. No.: 11/760,189

(22) Filed: Jun. 8, 2007

(65) Prior Publication Data

US 2008/0044317 A1 Feb. 21, 2008

(30) Foreign Application Priority Data

Aug. 21, 2006 (JP) .............................. 2006-224033

(51) Int. Cl.
*B01D 50/00* (2006.01)
(52) U.S. Cl. ..................................... 422/179
(58) Field of Classification Search ................. 422/168, 422/179, 180
See application file for complete search history.

(56) References Cited

U.S. PATENT DOCUMENTS

| 5,272,875 A | 12/1993 | Kaji |
| 2008/0047638 A1 | 2/2008 | Sugino |
| 2008/0178566 A1 | 7/2008 | Okabe |
| 2008/0181831 A1 | 7/2008 | Okabe |
| 2009/0049690 A1 | 2/2009 | Eguchi |
| 2009/0072498 A1 | 3/2009 | Tanahashi et al. |
| 2009/0075812 A1 | 3/2009 | Tanahashi et al. |
| 2009/0081442 A1 | 3/2009 | Tanahashi et al. |
| 2009/0081455 A1 | 3/2009 | Mitani |
| 2009/0084268 A1 | 4/2009 | Saiki |
| 2009/0087352 A1 | 4/2009 | Okabe |
| 2009/0087353 A1 | 4/2009 | Saiki |
| 2009/0114097 A1 | 5/2009 | Saiki |

FOREIGN PATENT DOCUMENTS

| DE | 196 41 049 A1 | 4/1998 |
| JP | 61-89916 | 5/1986 |
| JP | 3072281 | 5/2000 |
| WO | WO 98/45583 | 10/1998 |
| WO | WO 99/25964 | 5/1999 |
| WO | WO 2006/020058 A1 | 2/2006 |

OTHER PUBLICATIONS

U.S. Appl. No. 12/413,044.
U.S. Appl. No. 12/273,947, filed Nov. 19, 2008, Tanahashi, et al.
U.S. Appl. No. 12/256,630, Goshima et al.
U.S. Appl. No. 12/240,797, Saiki.
U.S. Appl. No. 12/327,454, Okabe.

*Primary Examiner*—Tom Duong
(74) *Attorney, Agent, or Firm*—Oblon, Spivak, McClelland, Maier & Neustadt, L.L.P.

(57) ABSTRACT

There is provided a holding sealer comprising inorganic fibers, in which the holding sealer has a first surface and a second surface, wherein the first surface has a reentrant portion within a region that is a fixed distance inside from an end of the first surface.

16 Claims, 10 Drawing Sheets

HOLDING SEALER AND EXHAUST GAS PROCESSING DEVICE

BACKGROUND OF THE INVENTION

1. Field of the Invention

This invention generally relates to a holding sealer including inorganic fibers, an exhaust gas processing device including such a holding sealer, and a manufacturing method of the same.

2. Description of the Related Art

The number of cars is greatly increasing since the beginning of this century, and the amount of exhaust gas from car engine rooms has been increasing amazingly as the number of cars has increased. Especially, various materials in the exhaust gas from diesel engines trigger environmental pollution, so that these materials are seriously influencing the global environment currently.

Under these circumstances, various exhaust gas processing devices have been suggested, and these have been used in practice. A typical exhaust gas processing device has a casing (for example, made of metal and the like) on a exhaust pipe connected to an exhaust gas manifold of the engine, in which casing an exhaust gas processing body having lots of cells, which are divided by cell walls, is arranged. Typically, these cells are constructed in a honeycomb structure. Especially in this case, the exhaust gas processing body is called a honeycomb structure body. As an example of the exhaust gas processing body, there are an exhaust gas filter such as a catalyst carrier, a diesel particulate filter (DPF), and the like. For example, in the case of the DPF, particles are trapped by cell walls during the exhaust gas passing through the exhaust gas processing body via each cell based on the above structure. Thereby particles can be removed from the exhaust gas. Materials of the exhaust gas processing body are metals, alloys, ceramics, etc. As a typical example of the exhaust gas processing body comprising ceramics, a honeycomb filter made of cordierite is known. Recently, from the viewpoint of heat resistance, mechanical strength, chemical stability, etc., a porous silundum sintered body is used as the exhaust gas processing body.

Usually, the holding sealer is placed between the above exhaust gas processing body and the casing. The holding sealer is used for protecting against breakage due to contact of the exhaust gas processing body with an inner surface of the casing during vehicle runs, and for protecting against leakage of the exhaust gas from a gap between the casing and the exhaust gas processing body. Also, the holding sealer plays an important role in preventing the exhaust gas processing body from falling off due to exhaust pressure of the exhaust gas. Moreover, the exhaust gas processing body needs to maintain high temperature for stabilizing the reaction, so that the holding sealer needs to have heat resistance. As a member satisfying these requirements, there is a sheet member including inorganic fibers such as alumina system fiber, etc.

The holding sealer is wound around at least a portion of the outer surface, except an open surface, of the exhaust gas processing body. For example, both edges of the holding sealer are engaged and the holding sealer is used by being fixed as one body with the exhaust gas processing body by means of taping. Then, the one whole body is assembled into the exhaust gas processing device by being pressed into the casing.

When the holding sealer has wound around the cylindrical exhaust gas processing body, "wrinkle" occurs inside of the holding sealer because of the different circumference length between an outer circumference and an inner circumference due to a thickness of the holding sealer, and there is a probability to form gaps between the exhaust gas processing body and the holding sealer. In this case, some exhaust gas which is introduced into the exhaust gas processing device is not circulated through within the exhaust gas processing body but discharged out through these gaps; thereby this wrinkle is a cause of leakage.

Because of this, in order to prevent the leakage of the non-processed exhaust gas due to the occurrence of such wrinkle, for example, it is proposed to provide lots of ditches on a surface of a contacting side (i.e., on the inner circumference side) with the exhaust gas processing body of the holding sealer, in which the ditches are perpendicular to a winding direction of the holding sealer and elongating one end of the holding sealer to the other end of the holding sealer (for example, see JP Patent Number 3072281). The following method is disclosed in the above patent document. In this method, the occurrence of wrinkle is restricted due to the existence of ditches provided on the holding sealer. Thereby the leakage of the non-processed exhaust gas can be restricted.

Patent Document 1: JP number 3072281

SUMMARY OF THE INVENTION

There is provided according to one aspect of the present invention, a holding sealer comprising inorganic fibers, in which the holding sealer has a first surface and a second surface, wherein the first surface has a reentrant portion within a region where there is a fixed distance inside from an end of the first surface.

Additionally, in the holding sealer according to the present invention, the reentrant portion may have plural dimple lines formed on the first surface or plural ditches formed on the first surface in parallel.

Additionally, in the holding sealer according to the present invention, it is preferable that the first surface have a winding direction for winding the holding sealer around an object and a vertical direction that is perpendicular to the winding direction, where the fixed distance from the end of the first surface is 5 mm or more respectively inside from both ends of the holding sealer in the vertical direction. Especially, it is preferable that the fixed distance from the end of the first surface be less than 50 mm respectively inside from both ends of the holding sealer in the vertical direction.

Additionally, in the holding sealer according to the present invention, the holding sealer may include an inorganic binder and/or an organic binder. A binding force between fibers is increased and the holding sealer is made easy to handle by adding the above binders into the holding sealer.

There is provided according to another aspect of the present invention, an exhaust gas processing device comprising:

an exhaust gas processing body, a holding sealer including inorganic fibers, which has a first surface and a second surface, and the holding sealer is wound around on at least a portion of an outer surface of the exhaust gas processing body such that the first surface is directly in contact with the outer surface of the exhaust gas processing body, and also in which the first surface has a reentrant portion within a region where there is a fixed distance inside from an end of said first surface, and a casing housing of said exhaust gas processing body and said holding sealer therein.

Additionally, in the exhaust gas processing device according to the present invention, the exhaust gas processing body may be a catalyst carrier or an exhaust gas filter.

BRIEF DESCRIPTION OF THE DRAWINGS

Other objects, features and advantages of the present invention will become more apparent from the following detailed description when read in conjunction with the accompanying drawings, in which.

DESCRIPTION OF THE PREFERRED EMBODIMENTS

Next, a description is given, with reference to the accompanying drawings, according to an embodiment of the present invention.

Figure 2:
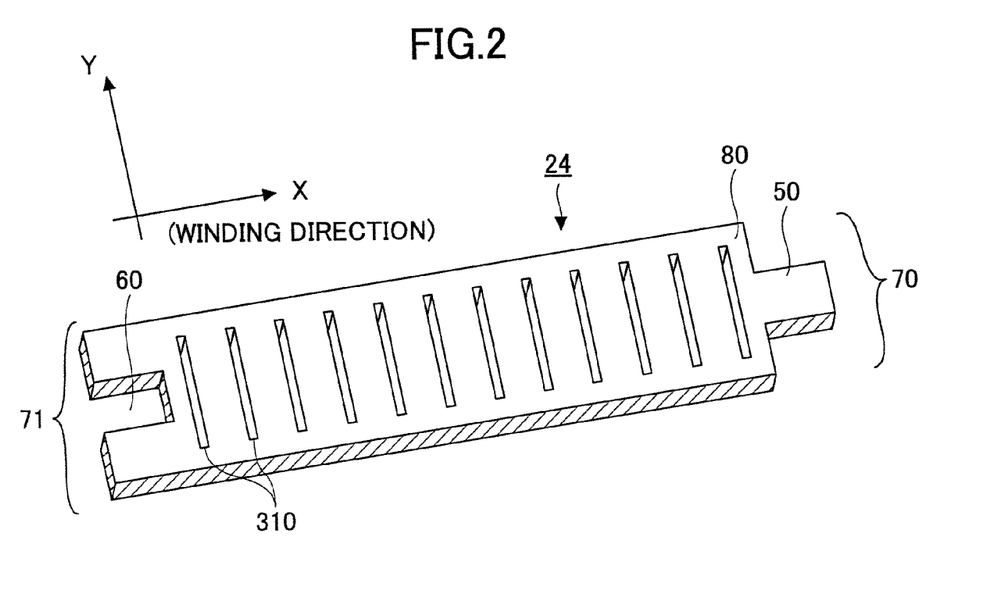
FIG. 2 is an example of a structure of the holding sealer of the present invention.
Figure 3:
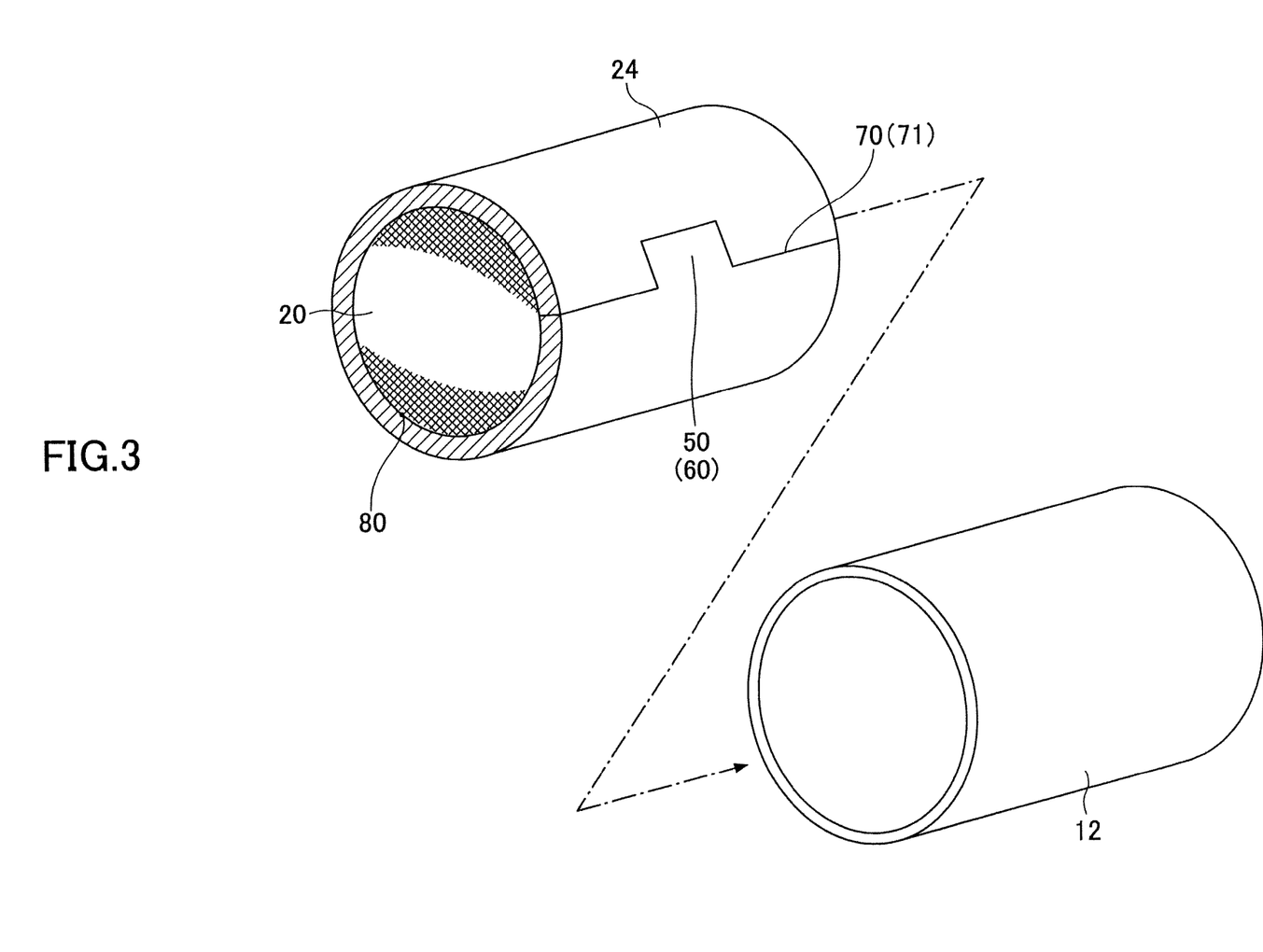
FIG. 3 is a schematic view showing a situation where the holding sealer and the exhaust gas processing body of the present invention are incorporated into the casing.

In FIG. 2, an example of a structure of the holding sealer of an embodiment of the present invention is shown. However, the holding sealer of the present invention is not limited to the shape in FIG. 2. Also, an exploded view of the exhaust gas processing device including the holding sealer of the present embodiment is shown in FIG. 3.

As shown in FIG. 2, the holding sealer according to an embodiment of the present embodiment has a pair of fitting salient 50 and fitting reentrant 60 at respective edges 70, 71 which are perpendicular to the winding direction (X direction). When the holding sealer 24 is wound around the exhaust gas processing body 20 like a catalyst carrier, the fitting salient 50 and the fitting reentrant 60 are fitted together as shown in FIG. 3, then the holding sealer 24 is fixed to the exhaust gas processing body 20. Then, the exhaust gas processing body 20 around which the holding sealer 24 is wound is installed into the cylindrical casing 12 made of a metal and the like by the press-fit means, for example.

According to an embodiment of the present invention, plural ditches 310 are provided on a surface (hereinafter, called a first surface or inner circumference surface) which directly contacts the exhaust gas processing body 20 of the holding sealer 24. These ditches 310 are arranged at equal distance having the same space between them along a direction (Y direction) which is substantially perpendicular to the winding direction (X direction) in the example of FIG. 2. However, these ditches 310 are not elongated to the sides of the holding sealer in the Y direction.

These ditches 310 restrict the influence due to the difference of circumference lengths (L(=LO−LI)) between an outer circumference (LO) and an inner circumference (LI) of the holding sealer occurring when a normal holding sealer is wound onto the exhaust gas processing body 20. This is because the ditches 310 function to assist the difference of circumference lengths (L) against the inner circumference (LI). Thus, by providing such ditches 310 in the holding sealer 24, when the holding sealer 24 is wound around the exhaust gas processing body 20, wrinkles on the inner circumference and cracks on the outer circumference due to the difference of circumference lengths (L(=LO−LI)) between an outer circumference (LO) and an inner circumference (LI) of the holding sealer can be restricted.

Figure 1:
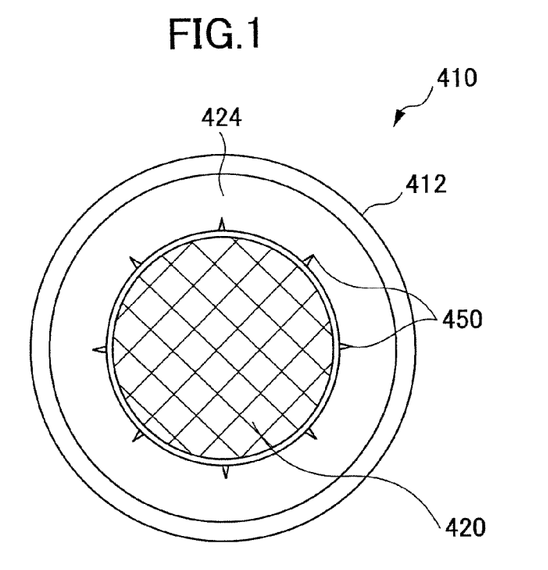
FIG. 1 is a schematic side view of the exhaust gas processing device by manufacturing such that a conventional holding sealer is wound around the exhaust gas processing body.

In addition, openings 450 of ditches shown in FIG. 1 do not occur on the inlet side of the exhaust gas in such ditches 310 when the holding sealer 24 is wound around the exhaust gas processing body 20. Thus, the penetration flow path which is elongated from one end to the other end of the holding sealer 24 can be restricted.

As described above, both effects can be possible in the holding sealer 24 according to an embodiment of the present invention; the prevention of occurrence of cracks on the outer circumference and wrinkles on the inner circumference when the holding sealer 24 is wound around the exhaust gas processing body 20 and the restriction of the occurrence of the penetration flow path. Therefore, the leakage of the non-processed exhaust gas from the holding sealer side can be restricted effectively in the exhaust gas processing device which uses the holding sealer according to an embodiment of the present invention.

Here, it is noted that the above described ditches 310 are not limited in shape if the ditches are not elongated to both ends in the Y direction (FIG. 2) of the holding sealer.

Figure 4:
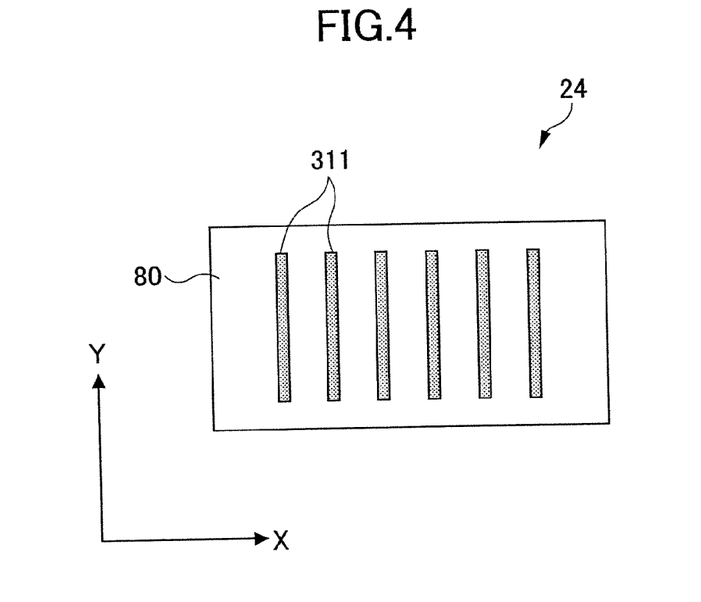
FIG. 4 is a schematic view showing an example of ditch patterns formed on a first surface of the holding sealer.
Figure 5:
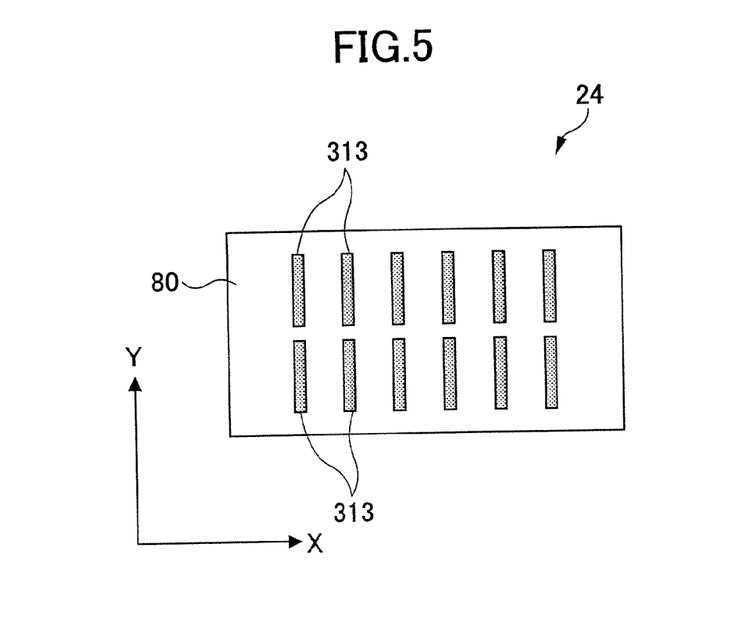
FIG. 5 is a schematic view showing another example of ditch patterns formed on a first surface of the holding sealer.
Figure 6:
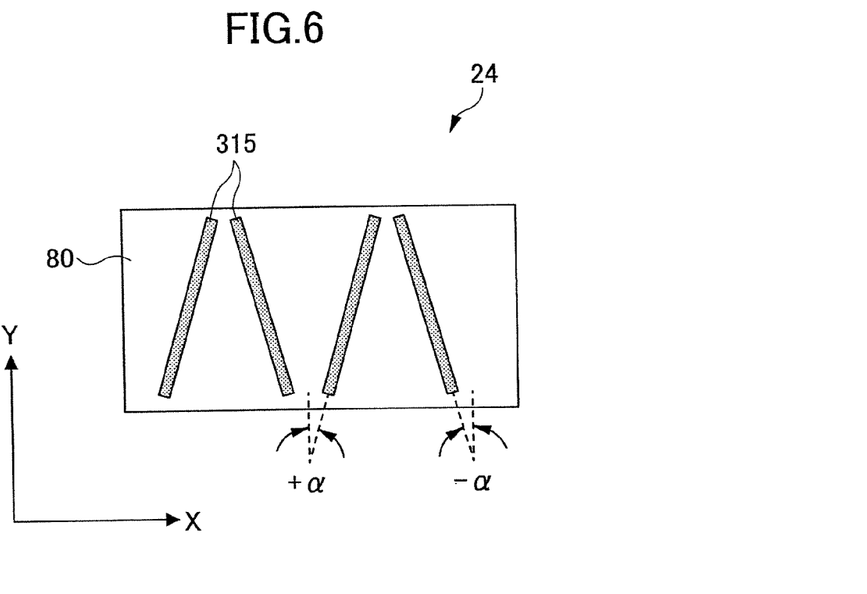
FIG. 6 is a schematic view showing a further other example of ditch patterns formed on a first surface of the holding sealer.
Figure 7:
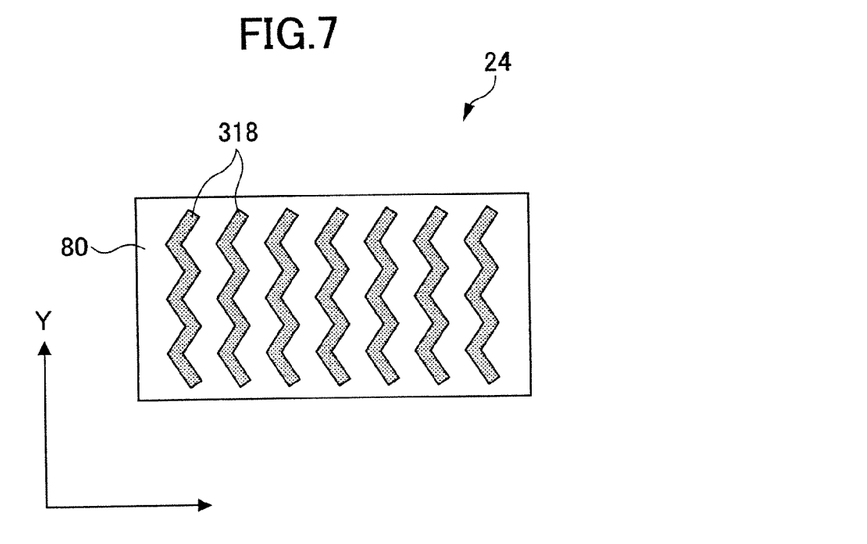
FIG. 7 is a schematic view showing a further other example of ditch patterns formed on a first surface of the holding sealer.

Examples of shapes of ditches formed on the first surface of the holding sealer according to embodiments of the present invention are shown in FIGS. 4-7. In example of FIG. 4, plural ditches which are substantially perpendicular to the winding direction (x direction) of the holding sealer 24 are formed at equal distance on the first surface 80 of the holding sealer 24. Also, in FIG. 5, lines of ditches which are elongated in the same direction as the ditches in FIG. 4 are formed at equal distance. Also, each line of ditches is formed of plural discontinuous ditches 313 having short length (two ditches in FIG. 5). Also, in FIG. 6, ditches 315 are formed at a slanted angle (α) to the Y direction of the holding sealer 24. This slanted angle α is not limited, but the slanted angle α is within a range −30 to +30 degrees of the Y direction in order to perform the above functions (the prevention mechanism of the occurrence of cracks and wrinkles) of ditches effectively. Also, in FIG. 7, zigzag shaped ditches 318 are formed at equal distance on the first surface 80. Also, the lines shown in FIGS. 4-7 are not necessarily formed at equal distance, but may be formed in unequal distances. Also, a cross-sectional shape of a ditch is not limited, but it may be various shapes such as triangle shape, semicircle shape, semi-ellipse shape, rectangular shape or trapezoid shape and the like.

Also, it is noted that there is no limitation about the dimensions of ditch 310 so long as it is not elongated to both ends of the Y direction of the holding sealer.

Figure 8:
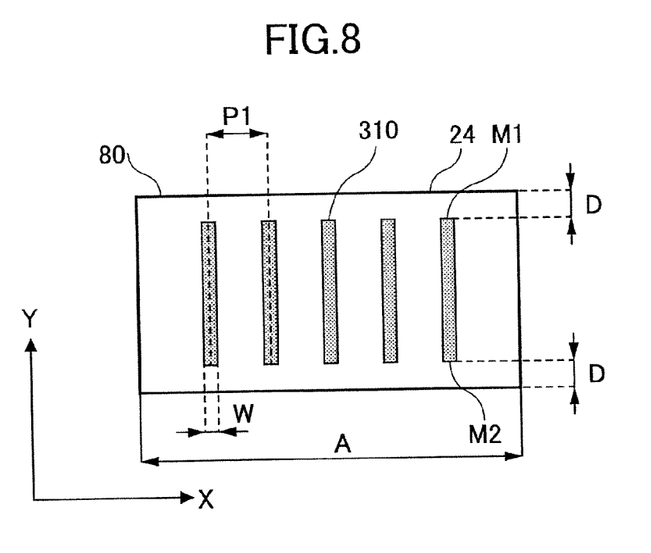
FIG. 8 is a top view explaining a dimension of ditches shown in FIG. 4.

FIG. 8 schematically shows each dimension of ditch 310 shown in the shape of FIG. 4 placed on the first surface of the holding sealer. One example of dimensions of ditch 310 will be explained below.

The length of ditch 310 is not limited. However, it is preferable as shown in a below example that end M1 and end M2 of the ditch 310 be placed at least about 5 mm from corresponding ends of the holding sealer 24 in the elongated direction of its ditch 310. That is, it is preferable that the distance D which is from the end of the holding sealer to the end M1 and end M2 of the ditch 310 be about 5 mm or more. Especially, it is preferable that the distance D be about 5 mm or more and less than about 50 mm in order to achieve a leakage prevention effect of exhaust gas to the maximum.

It is preferable that the depth of the ditch 310 be about ½ the thickness of the holding sealer. In the case that the depth is deeper than the above, there is a tendency for the occurrence of cracks in the holding sealer when being handled. Also, when the depth of cracks is less than the above depth, there is a possibility that the above function (an effect to restrict influence of the difference of circumference lengths) of the holding sealer cannot be sufficiently achieved.

Width w of ditches 310 and pitch P1 can be arranged freely. However, considering the above functions of ditches 310, it is preferable that width w of ditches 310 and pitch P1 be designed such that the total length of widths w of every ditch 310 formed on the first surface 80 equal the difference of circumference lengths L. This is because the influence of the difference of circumference lengths between the outer circumference and inner circumference occurring when the holding sealer is wound around becomes smallest, and the occurrence of cracks on the outer circumference and the occurrence of wrinkles on the inner circumference can be restricted more precisely.

For example, when an outer diameter of the exhaust gas processing body 20 is P and a thickness of the holding sealer is T, the inner circumference length of the holding sealer LI is Pπ, the outer circumference length of the holding sealer LO is (P+2T)π, and the difference of circumference lengths L is 2πT. Also, the pitch P1 of the ditch 310 is expressed below as total length A of the winding direction (x direction) of the holding sealer 24 and the number N of ditches within the holding sealer, for example.

$$P1 = A/N \quad (1)$$

As described above, when the total length of widths W of ditches 310 is equal to the difference of circumference lengths L, the influence due to the difference of circumference lengths L is restricted to the minimum; in this case, the following relationship is concluded.

$$WN = 2\pi T \quad (2)$$

That is, as the following relationship is concluded between the pitch P1 of the ditch 310 and the width w of the ditch 310, it is preferable to set the pitch P1 of the ditch and the width w of the ditch.

$$P1 = AW/(2\pi T) \quad (3)$$

Figure 9:
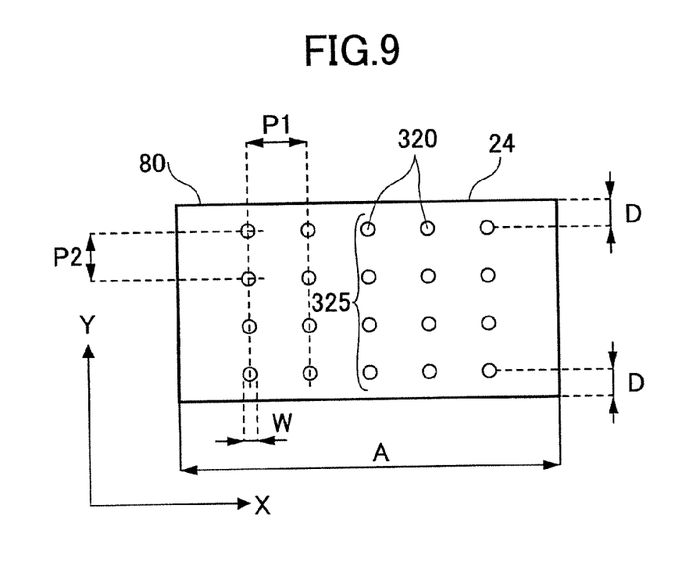
FIG. 9 is a schematic view showing an example of dimple patterns formed on a first surface of the holding sealer.

Similarly, in the case of forming dimple lines instead of ditches on the first surface, the dimensional shape of the dimple and/or dimple pattern is not restricted. For example, the cross-sectional shape of the dimple is a semicircle shape, semi-ellipse shape, inverse triangle shape, rectangular shape or trapezoid shape. For example, as shown in FIG. 9, plural dimples 320 of hemispheric shape are placed on the first surface 80 and dimple line 325 which is substantially perpendicular to the winding direction (x direction) of the holding sealer 24 may be formed at equal distance. Here, each dimple 310 in respective dimple lines 325 may be the same or different dimensional shapes and also may be placed at equal distance or unequal distances.

In addition, the above ditches 310 and dimples 320 (or dimple lines) may be combined.

The holding sealer 24 having such ditches 310 and/or dimples 320 is wound on the outer circumference of exhaust gas processing body 20 so as to place the first surface 80 inside (that is, the exhaust gas processing body side), both ends of the holding sealer 24 are mated and the holding sealer is fixed on the exhaust gas processing body 20 and then the holding sealer 24 is used. Then, the exhaust gas processing body 20 on which this holding sealer 24 is wound is placed into the casing 12 by any one of assembly methods of the press-fit means, the clamshell means, the winding and tightening means or the sizing means. Thereby, the exhaust gas processing device 10 is constructed.

Each assembly method is explained below with reference to drawings. FIGS. 10, 11, 12 and 13 are schematic views of respective assembly methods in which the exhaust gas processing body 20 that the holding sealer 24 is wound around (herein below, it is called "coated exhaust gas processing body" 210) is placed into the casing by the press-fit means, the clamshell means, the winding and tightening means or the sizing means, respectively.

Figure 10:
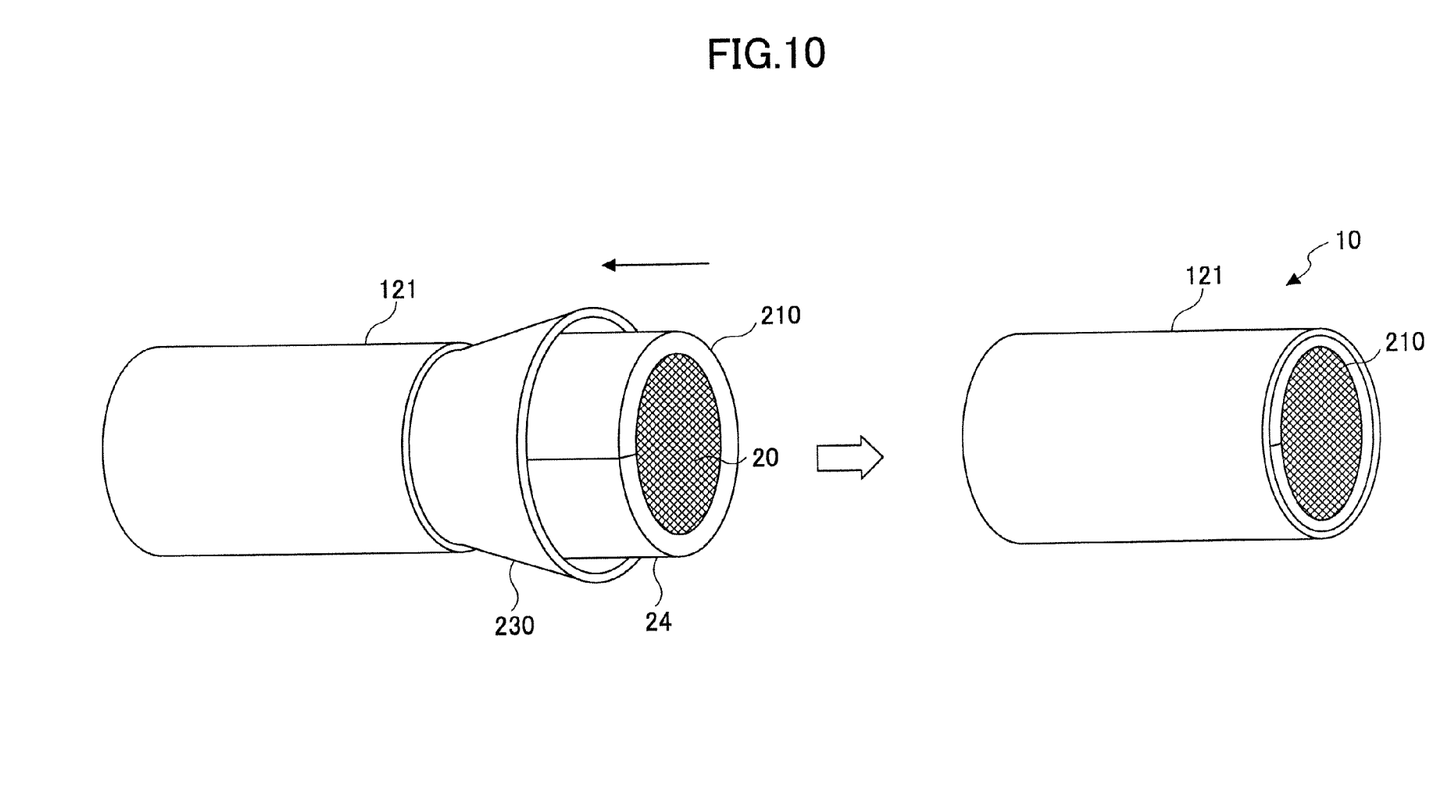
FIG. 10 is a schematic view showing a method of placing a coated exhaust gas processing body into the casing by press-fit means.

The press-fit means is a method of constructing the exhaust gas processing device 10 to place the coated exhaust gas processing body 210 at the predetermined position by pushing the coated exhaust gas processing body 210 into the casing 121 from one of the opening sides of the casing 121. In order to facilitate the insertion into the casing 121 of the coated exhaust gas processing body 210, as shown in FIG. 10, there is a case that a press-fit tool 230, in which the inner diameter is gradually decreased from one end to the other end and the minimum inner diameter is adjusted to be almost the same as the inner diameter of the casing 121, may be used. In this case, the coated exhaust gas processing body 210 is inserted from a wide inner diameter side of the press-fit tool, and placed into the casing 121 through the minimum inner diameter side.

Figure 11:
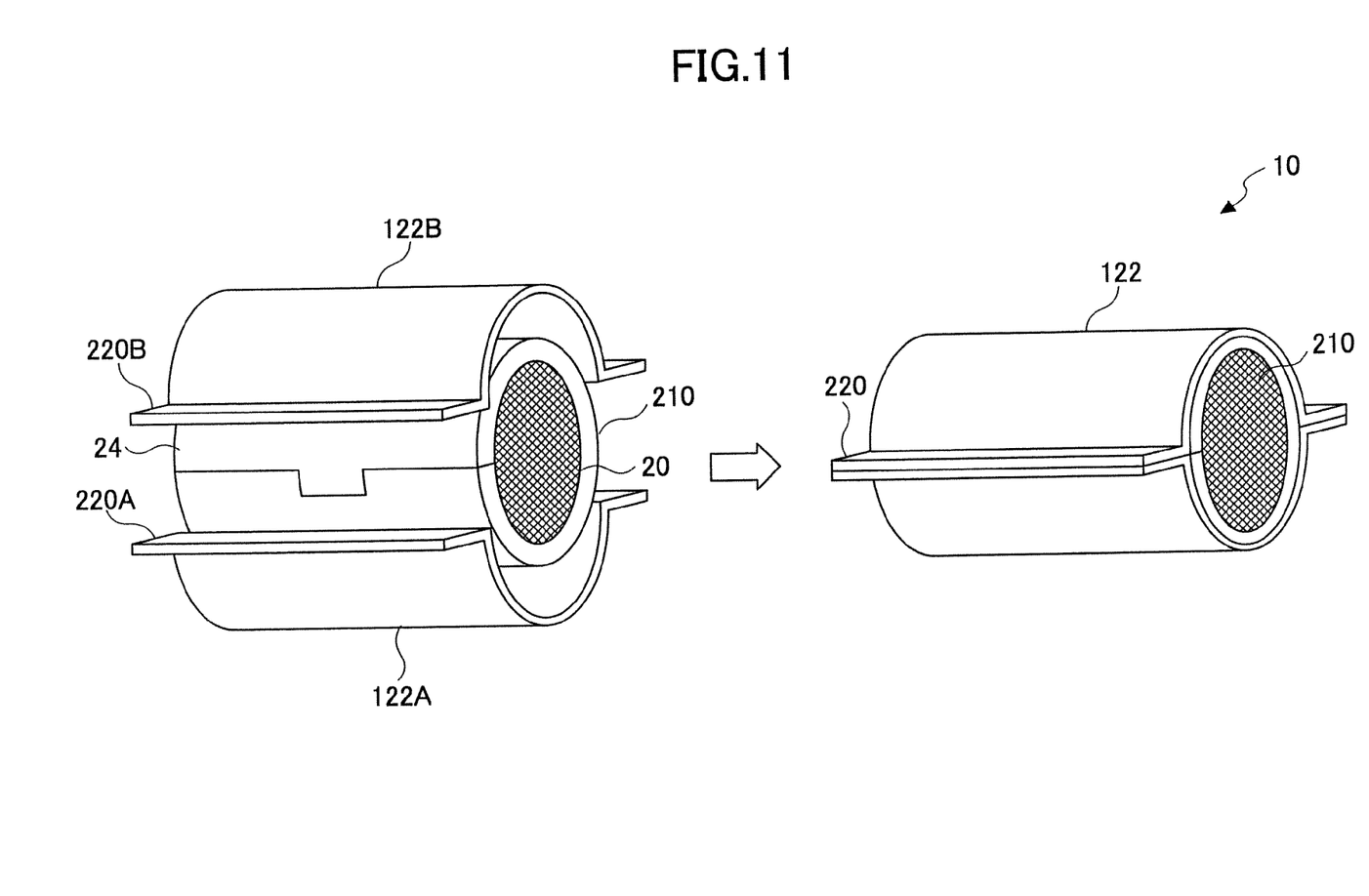
FIG. 11 is a schematic view showing a method of placing a coated exhaust gas processing body into the casing by clamshell means.

In the clamshell means, as shown in FIG. 11, casing member (122A, 122B), which is divided (for example, divided into two parts in example of FIG. 11) so that a pair of casings formed when facing each other mutually, is used. After the coated exhaust gas processing body 210 is placed in one of the casing members, the rest of the casing members are combined, then a casing 122 is formed such that these members are welded at flange part 220 (220A, 220B) for example, so that a gas processing device 10 in which the coated exhaust gas processing body 210 is placed at a predetermined position can be obtained.

Figure 12:
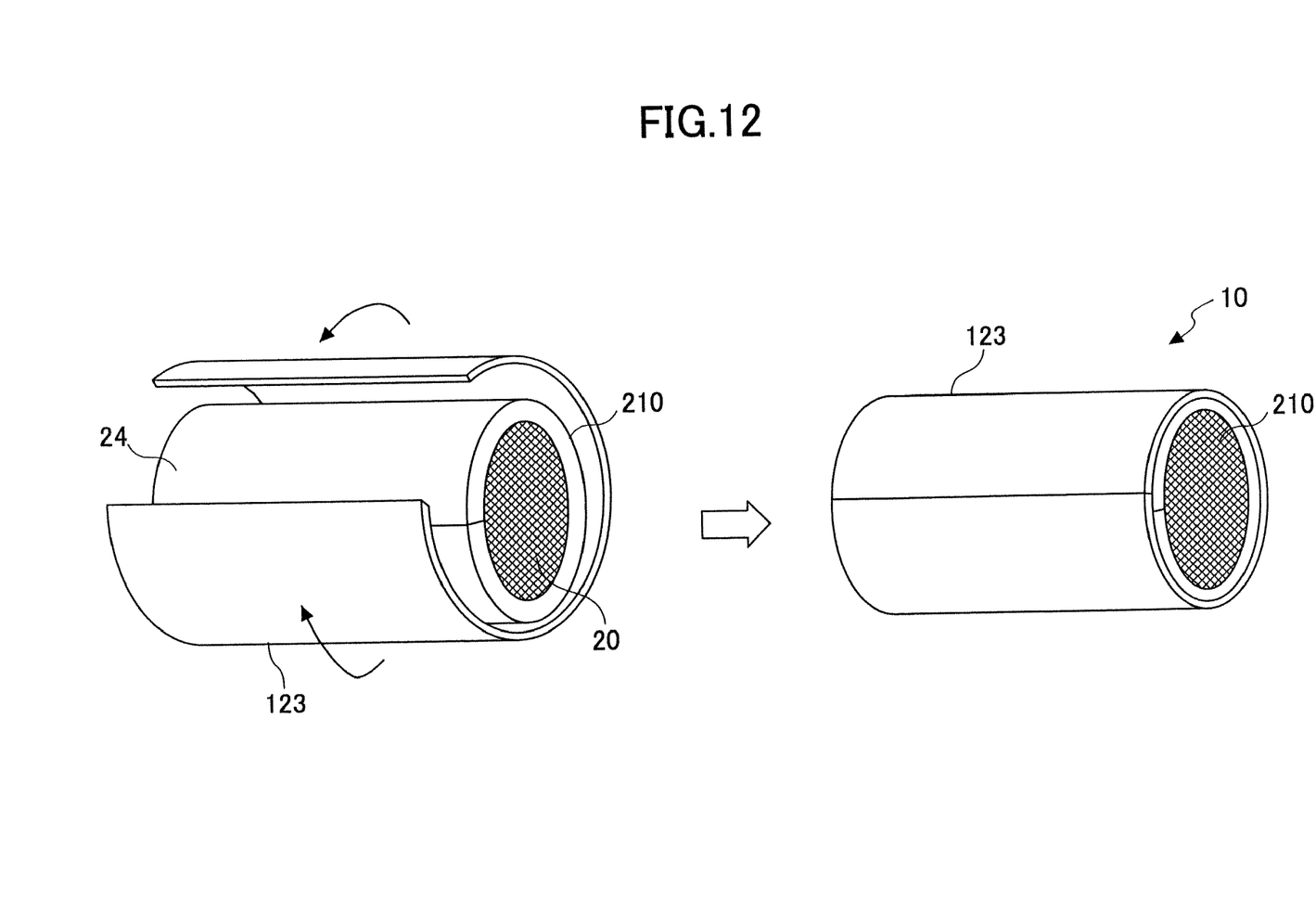
FIG. 12 is a schematic view showing a method of placing a coated exhaust gas processing body into the casing by winding and tightening means.

As shown in FIG. 12, the winding and tightening means is such that after a metal plate 123 as a casing member is wound around the coated exhaust gas processing body 210, the metal plate is tightened up with wire ropes and the like, so that the metal plate 123 is put directly in contact on the coated exhaust gas processing body 210 circumferentially with a predetermined surface pressure. Finally, one end of the metal plate 123 is welded to the other end or a surface of the lower metal plate 123, and thereby a gas processing device 10 in which the coated exhaust gas processing body 210 is placed inside of the casing 123 can be obtained.

Figure 13:
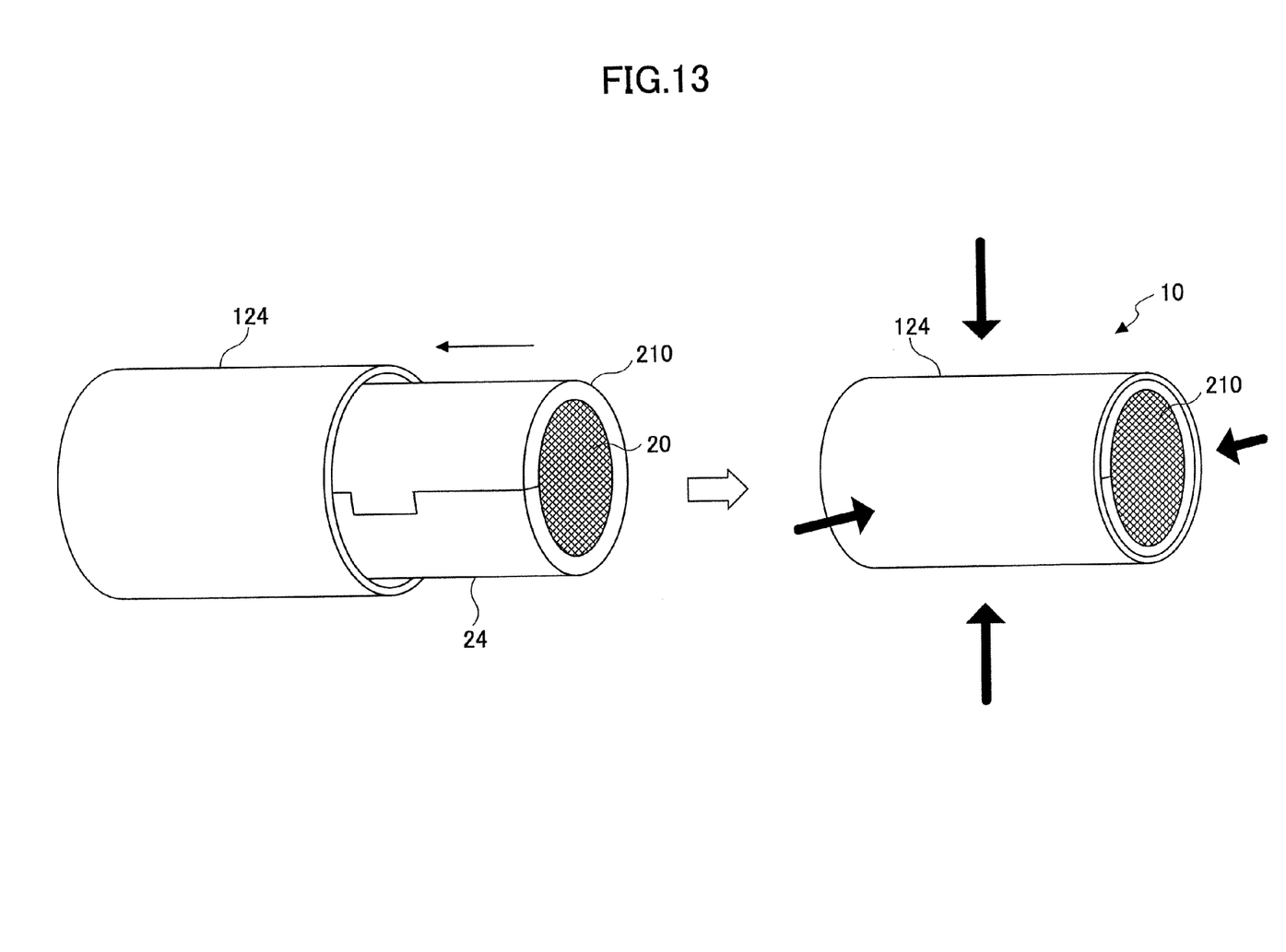
FIG. 13 is a schematic view showing a method of placing a coated exhaust gas processing body into the casing by sizing means.

Moreover, as shown in FIG. 13, the sizing means is such that after the coated exhaust gas processing body 210 is inserted into a metal shell 124 having an inner diameter which is larger than the outer diameter of the coated exhaust gas processing body 210, the metal shell 124 is evenly compressed (sized (JIS-z2500-4002)) from the outer circumference side by a press machine and the like. The inner diameter of the metal shell 124 is adjusted correctly in a desired dimension by the sizing process, and the coated exhaust gas processing body 210 can be placed at the predetermined position.

Also, metals such as heat-resistant alloys can be used for materials of the casing used in these methods.

Figure 14:
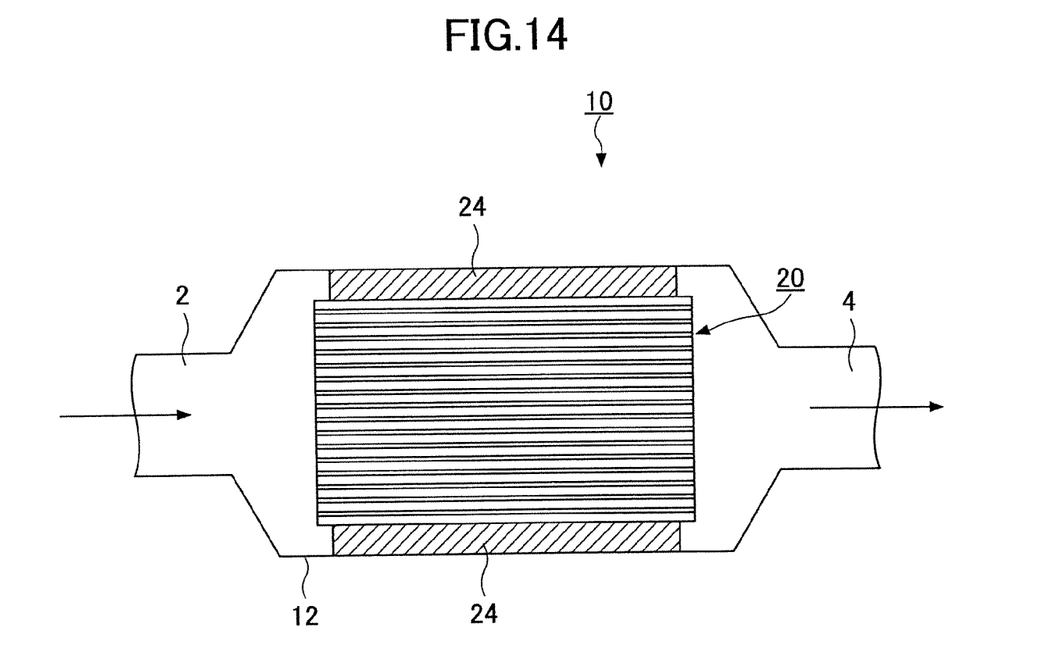
FIG. 14 is a view showing one structural example of the exhaust gas processing device of the present invention.

One structural example of the exhaust gas processing device 10 which is constructed in such a way is shown in FIG. 14. In the example of FIG. 14, the exhaust gas processing body 20 is a catalyst carrier having many through-holes in a direction parallel to the gas flow. For example, the catalyst carrier is composed of honeycomb-shaped porous silundum and the like. Also, the exhaust gas processing device 10 according to the embodiment of the present invention is not limited to such a structure. For example, the exhaust gas processing body 20 can be a DPF, in which ends of through-holes are sealed in a checkered design. In such an exhaust gas processing device, the exhaust gas which is introduced into the device is passed through the holding sealer, and discharged with proper processing.

One example of a manufacturing method of the holding sealer of the present invention is explained below.

The holding sealer according to an embodiment of the present invention can be manufactured by a papermaking method. The papermaking method is also called usual wet processing, and it is a processing method for manufacturing the holding sealer through each process of mixing fibers, stirring, opening of fibers, slurrying, paper molding and compression drying as in papermaking.

First, predetermined quantities of inorganic fiber raw materials, inorganic binders and organic binders are mixed in water. Original cotton bulk of mixed fibers of alumina and silica as inorganic fiber raw materials can be used, for example. However, inorganic fiber raw materials are not limited to the above materials; for example, inorganic fiber raw materials may be composed of only alumina and silica. Alumina sol and silica sol and the like are used as inorganic binders, for example. Also, latex and the like are used as organic binders.

Next, the obtained mixture is stirred like a papermaker, and open fiber slurry is prepared. Usually, the stirring and opening fiber process is performed for about 20-120 seconds. Then, the obtained slurry is molded in a desired shape in a molding machine, and a material mat of the holding sealer is obtained by further dehydration.

Further, this material mat is compressed with a pressing machine and the like, heated and dried at about 90-150° C. Thereby, the holding sealer can be provided. Here, for example, by using the press machine in which a projection pattern corresponding to a dimensional shape of a ditch (or dimple lines) formed on the surface of the holding sealer is formed on a surface of the machine, the holding sealer having the desired ditch (or dimple lines) on the first surface can be manufactured by compressing the material mat. Usually, the compression process is performed such that the density of the holding sealer after finishing compression becomes about 0.10 g/cm$^3$-0.40 g/cm$^3$.

The holding sealer which is manufactured as above is cut for easy handling, and is further used for cutting in a predetermined final shape. Also, before or after cutting, further processing may be performed using the obtained holding sealer.

As necessary, the organic binder such as resin is injected into the holding sealer which has been cut. Thereby, bulkiness of the holding sealer can be controlled and an assembling ability when the holding sealer is wound around the exhaust gas processing body within the exhaust gas processing device is improved. In addition, when a hot exhaust gas is introduced into the exhaust gas processing device, organic binders in the holding sealer are lost. Thereby, the compressed holding sealer is restored and retention of the holding sealer is improved.

It is preferable that the amount of organic binder be between about 1.0 and 10.0 weight %. If the amount of organic binder is 1.0 weight % or more, an improved effect of the ability of assembling can be obtained sufficiently. Also, if the amount of organic binder is 10.0 weight % or less, the amount of the organic contents which is discharged at the time of use of the exhaust gas processing device is not increased.

Also, it is preferable to use acrylic resin (ACM), acrylnitryl-butadiene gum (NBR), and stylene-butadiene gum (SBR) as organic binders.

The holding sealer is impregnated with resin by spray coating using aqueous dispersion prepared with the above organic binders and water. Also, any excess coated solid and water included in the holding sealer are removed in the next step.

In the next step, any excess solid is removed and a drying process is performed. Removing the excess solid is processed by vacuum aspiration. Also, removing the excess water is processed by the heat compression drying method. In this method, because a pressing pressure is applied to the holding sealer, the excess water can be removed and the holding sealer can be made thin. The drying process is performed around 95-155° C. If the temperature is about 95° C. or more, the drying time is not greater and production efficiency is not decreased. Also, if the drying temperature is 155° C. or less, decomposition of organic binders themselves begins to start and adhesive performance due to organic binders is not lost.

Thereby, by constructing the exhaust gas processing device with the holding sealer which is manufactured as in the above according to the present invention, the exhaust gas processing device in which the leakage of the non-processed exhaust gas is advantageously restrained can be obtained.

In the below, effects according to embodiments 3 of the present invention will be explained using examples.

EXAMPLES

In order to verify effects of the present invention, each kind of examination was performed using the holding sealer of the present invention. The holding sealer was manufactured by the following procedures.

Manufacturing 1 of the Holding Sealer

Original cotton bulk of alumina fibers 1200 g, organic binder (latex) 60 g, inorganic binder (alumina sol) 12 g and water were added, and the mixture was mixed with so that the fiber density in a material solution became 5 weight %. Then, the material solution was stirred in a papermaker for 60 seconds. Thus, the material solution which was stirred and opened the fiber was moved to the molding machine having dimensions of 930 mm×515 mm×400 mm. Then, a material mat of alumina fibers was obtained by removing water via a mesh placed on a bottom surface of the molding machine.

Next, this material mat was press dried at 120° C. for 30 minutes using a press machine having various surface patterns. A linear-shaped projection line or a point-shaped projection line is provided on a surface of each press machine such that a reentrant portion of shape pattern shown in FIG. 8 or FIG. 9 is formed on one side of the holding sealer after completion. These projection lines within the surface pattern of one of the press machines have same length mutually, and they are arranged at equal distance and in parallel. However, the full length of the line is different depending on the respective surface pattern (7 different types) of each press machine (however, the height of the projection is 4 mm for all surface patterns). The holding sealer having a thickness 13 mm and a density 0.20 g/cm³ was obtained via a pressing process due to the press machine having each surface pattern as the above. This holding sealer was cut into dimensions shown in a shape (vertical length (Y direction) 200 mm, horizontal (X direction) 440 mm (except the fitting salient and fitting reentrant)) in FIG. 2. Thereby, samples for evaluation concerning examples 1-6 and a comparative example were obtained.

The reentrant shape and dimensions and other characteristics of samples for evaluation concerning examples 1-6 and the comparative example are shown in Table 1.

material solution was stirred in a papermaker for 60 seconds. Thus, the material solution which was stirred and opened the fiber was moved to the molding machine having dimensions of 930 mm×515 mm×400 mm. Then, the material mat of alumina fibers was obtained by removing water via a mesh placed on a bottom surface of the molding machine.

Next, this material mat was pressed dried at 120° C. for 30 minutes using the press machine having various surface patterns. The point-shaped projection line is provided on the surface of each press machine such that a reentrant portion of the shape pattern shown in FIG. 9 is formed on one side of the holding sealer after completion. These projection lines within the surface pattern of one of the press machines have same length mutually, and they are arranged at equal distance and in parallel. However, the full length of the line is different depending on the respective surface pattern (4 different types) of each press machine (however, the height of the projection is 4 mm for all surface patterns). The holding sealer having a thickness 9 mm and a density 0.20 g/cm³ was obtained via a pressing process due to the press machine having each surface pattern as above. This holding sealer was cut to have dimensions shown in a shape (vertical length (Y direction) 200 mm, horizontal (X direction) 440 mm (except fitting salient and

TABLE 1

| NO. | REENTRANT SHAPE | T THICKNESS OF MAT (mm) | D DISTANCE TO THE END OF THE HOLDING SEALER (mm) | W X DIRECTION WIDTH (mm) | P1 X DIRECTION PITCH (mm) | P2 Y DIRECTION PITCH (mm) | E DEPTH (mm) | LEAKAGE AMOUNT (m · cm/ kPa/sec) | RESULTS OF WINDING EXAMINATION |
|---|---|---|---|---|---|---|---|---|---|
| EXAMPLE 1 | DIMPLE LINE | 13 | 5 | 5 | 30 | 10 | 4 | 0.04 | ○ |
| EXAMPLE 2 | DIMPLE LINE | 13 | 30 | 5 | 30 | 10 | 4 | 0.04 | ○ |
| EXAMPLE 3 | DIMPLE LINE | 13 | 50 | 5 | 30 | 10 | 4 | 0.04 | X |
| EXAMPLE 4 | DITCH | 13 | 5 | 5 | 30 | — | 4 | 0.05 | ○ |
| EXAMPLE 5 | DITCH | 13 | 30 | 5 | 30 | — | 4 | 0.05 | ○ |
| EXAMPLE 6 | DITCH | 13 | 50 | 5 | 30 | — | 4 | 0.05 | X |
| COMPARATIVE EXAMPLE 1 | DITCH | 13 | 0 | 5 | 30 | — | 4 | 0.23 | ○ |

Manufacturing 2 of the Holding Sealer

Original cotton bulk of alumina fibers 800 g, organic binder (latex) 60 g, inorganic binder (alumina sol) 12 g and water were added, and the mixture was mixed with so that the fiber density in a material solution became 5 weight %. Then, the fitting reentrant)) in FIG. 2. Thereby, samples for evaluation concerning examples 7-10 were obtained.

The reentrant shape and dimensions and other characteristics of samples for evaluation concerning examples 7-10 are shown in Table 2.

TABLE 2

| NO. | REENTRANT SHAPE | T THICKNESS OF MAT (mm) | D DISTANCE TO THE END OF THE HOLDING SEALER (mm) | W X DIRECTION WIDTH (mm) | P1 X DIRECTION PITCH (mm) | P2 Y DIRECTION PITCH (mm) | E DEPTH (mm) | LEAKAGE AMOUNT (m · cm/ kPa/sec) | RESULTS OF WINDING EXAMINATION |
|---|---|---|---|---|---|---|---|---|---|
| EXAMPLE 7 | DIMPLE LINE | 9 | 5 | 5 | 30 | 10 | 4 | 0.04 | ○ |
| EXAMPLE 8 | DIMPLE LINE | 9 | 30 | 5 | 30 | 10 | 4 | 0.04 | ○ |
| EXAMPLE 9 | DIMPLE LINE | 9 | 50 | 5 | 30 | 10 | 4 | 0.04 | ○ |
| EXAMPLE 10 | DIMPLE LINE | 9 | 70 | 5 | 30 | 10 | 4 | 0.04 | X |

As shown in Tables 1 and 2, the holding sealer concerning examples 1-3 and examples 7-10 has dimple lines 325 on the first surface, and the holding sealer concerning examples 4-6 and comparative example has ditches 310 on the first surface. Also in Table 1 and 2, distance D (mm) from the dimple line or ditch to the end portion of the holding sealer, width W in the X direction (mm), pitch P1 (mm) in the X direction and pitch P2 (mm) in the Y direction express the dimensions shown in FIG. 8 and FIG. 9 respectively. However, the pitch P2 in the Y direction is not defined in the case where the reentrant shape is a ditch as shown clearly from FIG. 8. Also, in the holding sealer of the comparative example, the distance D from the ditch to the end portion of the holding sealer is zero because the ditch is elongated to both end portion of the holding sealer along the Y direction. Also, the depth of the dimple or ditch was 4 mm in each example and the comparative example.

Also, it should be noted that a relationship between the width D in the X direction and the pitch P1 in X direction for the ditch concerning examples 4-6 and the comparative example is satisfied with a condition of the above formula (3) when these holding sealers (thickness 13 mm) are wound around an outer portion of a cylinder having an outer diameter 5 inches (about 127 mm).

Examination for Evaluating

Next, a leakage examination and a winding examination were performed using each holding sealer sample manufactured in the above method.

The leakage examination was performed as follows. First, each holding sealer sample is wound around a cylinder (a non-hollow body) having an outer diameter 5 inches, and both ends of the holding sealer sample are fitted and fixed on the cylinder. Next, this unified member is placed into a metallic casing by the press-fit means, and this resulting member is a sample body. The density of the holding sealer after placement was 0.45 g/cm$^3$. Then, the resulting member is placed on a tool having almost the same inner diameter of an outer shape of the casing. Under this condition, air which has known pressure and speed is blown into the sample body along an axis direction of the sample body from one side of the sample body to the other side of the sample body. The amount of air which is discharged from the sample body is measured using a meter to measure the amount of air arriving on the other side of the sample body. According to the above examination, the leakage amount is calculated as follows.

The leakage amount (m·cm/kPa/sec)=speed of the discharged air (m/sec)/[inflow pressure (kPa)/length of sample in an inflow direction (cm)]

Also, in the winding examination, it was evaluated whether a sample cracked by visual observation when each holding sealer sample is wound around on the cylinder having the outer diameter 5 inches, and both ends of the holding sealer sample are fitted and fixed on the cylinder as described above.

Examination for Evaluating

Results of the leakage examination and the winding examination for each holding sealer are shown in Table 1 and 2. Based on these Tables, it is recognized that the leakage amount of the exhaust gas for the holding sealer of examples 1-10 is advantageously decreased compared to the holding sealer of the comparative example. It is also recognized that a prevention effect of leakage does not depend on the reentrant shape and the same effect is obtained with either dimples or ditches.

Also, it is recognized that cracks occur on the outer surface of the holding sealer for the holding sealer concerning examples 3, 6 and 10 in the winding examination. This is because of following. That is, the distance D from the reentrant portion (the end portion of dimple line or the end portion of ditch line) to the end of the holding sealer is larger, thereby the effect to restrict influence of the different circumference length hardly appears.

However, regarding the leakage examination, the leakage amount of the holding sealer of examples 3, 6 and 10 is the same as that of the holding sealer of examples 1, 2 and examples 4, 5 and examples 7-9. Thus, based on these results, the effect that cracks occurring on the outer surface of the holding sealer have on decreasing the sealability of the exhaust gas processing device is not remarkable. However, there is a possibility that these cracks lead to the leakage of the exhaust gas if these cracks develop more. Thereby, it is preferable that the upper limit be set concerning the distance from the end of the holding sealer to the dimple line or the ditch. Also, the distance D from the end of the holding sealer to the dimple line is varied depending on the thickness of the holding sealer when cracks occur on the outer surface of the holding sealer based on the comparison of Table 1 and 2, that is comparing examples 1-3 and examples 7-10. Therefore, it is difficult to define the upper limit as one value, but it is preferable that the upper limit be defined as less than 50 mm in the case where the thickness of the holding sealer is at least about 13 mm or below.

INDUSTRIAL APPLICABILITY

The holding sealer and the exhaust gas processing device according to the present invention are applicable to the exhaust gas processing units and the like for vehicles.

The present invention is not limited to the specifically disclosed embodiment, and variations and modifications may be made without departing from the scope of the present invention.

The present application is based on Japanese priority application No. 2006-224033 filed on Aug. 21, 2006, the entire contents of which and JP No. 3072281 are hereby incorporated by references.

What is claimed is:

1. A holding sealer comprising:
   inorganic fibers formed into a mat having a cylindrical shape with an inner first surface and an outer second surface,
   wherein the first surface has a reentrant portion within a region that is a fixed distance inside from an edge of the first surface defining an end of the cylindrical shape along an axial direction thereof,
   wherein the re-entrant portion being a plurality of ditches or dimple lines each having a width such that a total length amounting to widths of all of said plurality of ditches or dimple lines in a circumferential direction on the first surface equals a difference between an inner circumference of the cylindrical shape formed by the first surface and an outer circumference of the cylindrical shape formed by the second surface.

2. The holding sealer as claimed in claim 1,
   wherein the plurality of ditches or dimple lines are formed at equal distances.

3. The holding sealer as claimed in claim 1, wherein the plurality of ditches or dimple lines are mutually parallel.

4. The holding sealer as claimed in claim 3, comprising:
   a plate member that is wound in the circumferential direction around an object so that ends of the plate member mate to form the cylindrical shape,
   wherein the fixed distance from each edge of the first surface defining a corresponding one of two ends of the cylindrical shape along the axial direction is about 5 mm or more.

5. The holding sealer as claimed in claim 4, wherein the fixed distance from each edge of the first surface defining a corresponding one of two ends of the cylindrical shape along the axial direction is less than about 50 mm.

6. The holding sealer as claimed in claim 1, further comprising an inorganic binder and/or an organic binder.

7. An exhaust gas processing device comprising:
a exhaust gas processing body;
a holding sealer including inorganic fibers, which has a cylindrical shape with an inner first surface and an outer second surface, and which is accommodated on at least a portion of the exhaust gas processing body such that the first surface is in direct contact with an outer surface of the exhaust gas processing body, the first surface having a reentrant portion at a fixed distance inside from an edge of said first surface defining an end of the cylindrical shape along an axial direction thereof, the reentrant portion being a plurality of ditches or dimple lines each having a width such that a total length amounting to widths of all of said plurality of ditches or dimple lines in a circumferential direction on the first surface equals a difference between an inner circumference of the cylindrical shape formed by the first surface and an outer circumference formed by the second surface; and
a casing configured to house said exhaust gas processing body and said holding sealer therein.

8. The exhaust gas processing device as claimed in claim 7, wherein the exhaust gas processing body forms a catalyst carrier or an exhaust gas filter.

9. A holding sealer comprising:
a plate member, including inorganic fibers and having a first surface and a second surface opposite to the first surface, to be wound in a first direction on at least a portion of an outer peripheral surface of an exhaust gas processing body so that the first surface makes contact with the outer peripheral surface of the exhaust gas processing body,
wherein the first surface has a reentrant portion within a region that is a fixed distance inside from an end of the first surface, extending parallel to the first direction, along a second direction perpendicular to the first direction.

10. The holding sealer as claimed in claim 9, wherein the reentrant portion includes a plurality of dimple lines formed on the first surface.

11. The holding sealer as claimed in claim 10, wherein:
the reentrant portion is arranged within the region that is the fixed distance inside from each of two mutually opposite ends of the first surface, respectively extending parallel to the first direction, along the second direction, and
the fixed distance is about 5 mm or more.

12. The holding sealer as claimed in claim 11, wherein the fixed distance is less than about 50 mm.

13. The holding sealer as claimed in claim 9, wherein the reentrant portion includes a plurality of mutually parallel ditches formed on the first surface.

14. The holding sealer as claimed in claim 9, wherein the holding sealer further includes an inorganic binder and/or an organic binder.

15. An exhaust gas processing device comprising:
a exhaust gas processing body;
a plate member, including inorganic fibers and having a first surface and a second surface opposite to the first surface, to be wound in a first direction on at least a portion of an outer peripheral surface of an exhaust gas processing body so that the first surface makes contact with the outer peripheral surface of the exhaust gas processing body, wherein the first surface has a reentrant portion within a region that is a fixed distance inside from an end of the first surface, extending parallel to the first direction, along a second direction perpendicular to the first direction; and
a casing configured to house the exhaust gas processing body and the holding sealer therein.

16. The exhaust gas processing device as claimed in claim 15, wherein the exhaust gas processing body forms a catalyst carrier or an exhaust gas filter.

* * * * *